UNITED STATES PATENT OFFICE.

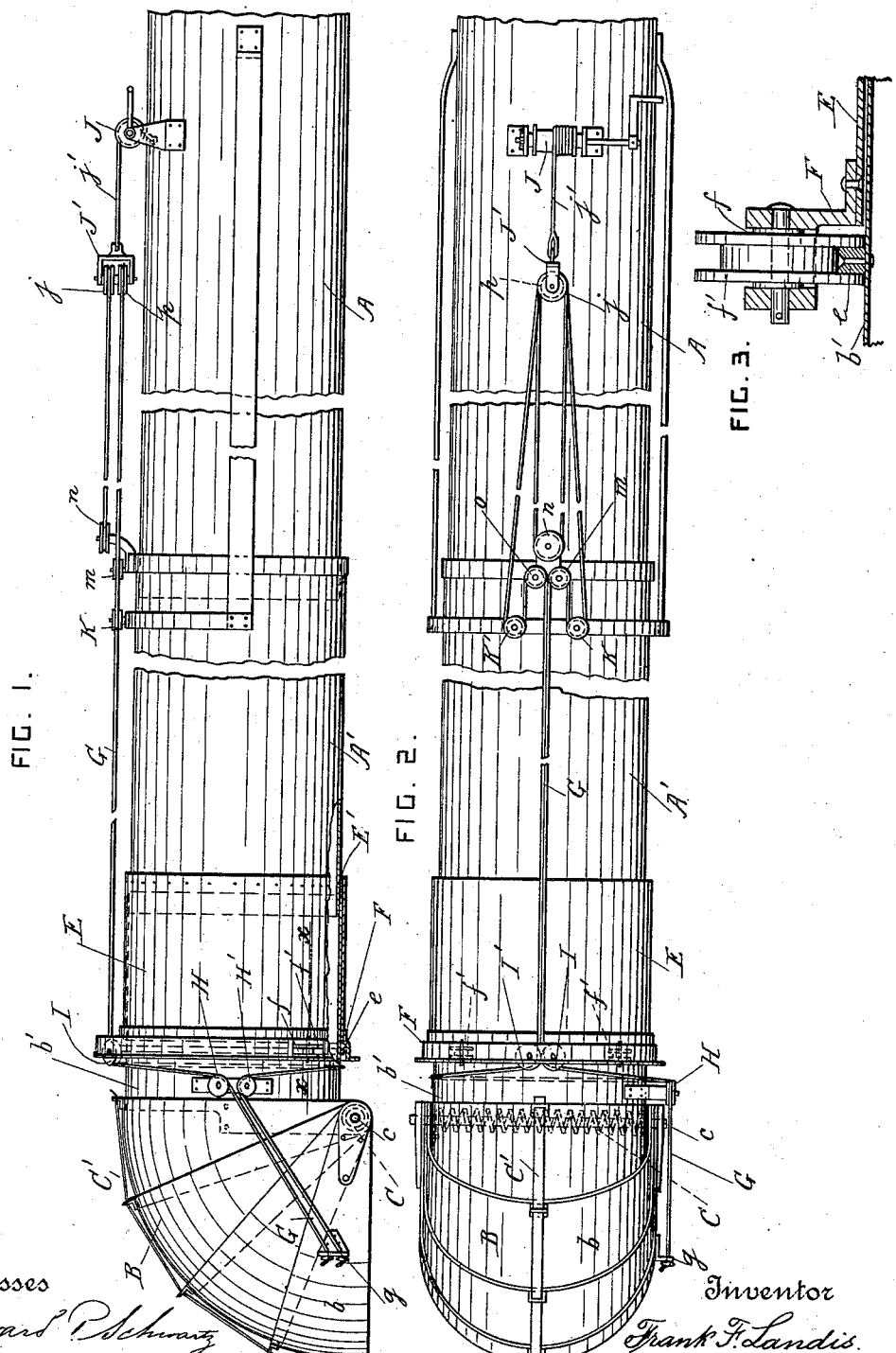

FRANK F. LANDIS, OF WAYNESBOROUGH, PENNSYLVANIA.

DEFLECTOR FOR PNEUMATIC STRAW-STACKERS.

SPECIFICATION forming part of Letters Patent No. 580,669, dated April 13, 1897.

Application filed November 7, 1895. Serial No. 568,171. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Deflectors for Pneumatic Straw-Stackers; and I do hereby declare the following to be a full, clear, and exact description of the invention, such as will enable others skilled in the art to which it appertains to make and use the same.

This invention relates to deflectors such as used on the discharge-pipes of pneumatic straw-stackers; and it consists in the novel construction and combination of the parts hereinafter fully described and claimed.

In the drawings, Figure 1 is a side view, partly in section, of a telescopic discharge-pipe provided with a deflector and means for operating it according to this invention. Fig. 2 is a plan view of the same. Fig. 3 is a longitudinal section drawn to a larger scale and taken on the line $x$ $x$ in Fig. 1.

A is a portion of the telescopic discharge-pipe of a pneumatic straw-stacker of any approved construction, and A' is its upper slidable section.

B is a deflector connected to the upper section of the discharge-pipe and operating to direct the straw onto the stack. This deflector is preferably formed of U-shaped segments $b$, which overlap each other, and a short pipe $b'$. The segments $b$ are pivoted together by a pin $c$, and the rear segment is secured to the pipe $b'$.

C is a spring which operates to hold the segments in their extended position, as shown in Fig. 1. This spring is preferably arranged around the pin $c$, but it may be arranged in any other convenient position, or any other equivalent means may be used to normally hold the segments in their extended positions.

C' is a flexible check-strap which prevents the segments from being forced too far forward by the spring. This strap is preferably attached to the upper portions of the segments, and any other equivalent means for preventing the segments from moving too far forward may be used in place of it.

This deflector is specially intended for use on straw-stackers which have telescopic discharge-pipes, but it may also be used on discharge-pipes which are not telescopic.

When the discharge-pipe is telescopic, it cannot conveniently be revolved upon its own axis, and the deflector is therefore provided with means for revolving it upon the axis of the discharge-pipe, so that the straw may be thrown upward or to either side when required.

The short pipe $b'$ of the deflector is revoluble inside the upper end of the upper pipe-section, and in order that it may revolve freely and present no obstruction to the straw the upper end portion of the said pipe is formed of a short section of pipe E.

E' is a distance-ring interposed between the pipes A' and E, which are riveted together and to the said ring. The ring is slightly thicker than the pipe $b'$, so that the said pipe can turn freely in the pipe E and on the end of the pipe A'. An annular space is formed between the pipes E and A' in front of the ring E', and the end of the pipe $b'$ turns in this space. The lower end of the pipe $b'$ abuts against the upper edge or end of the ring E', and the said ring forms an annular bearing for receiving the downward thrust of the pipe $b'$.

In order to afford additional freedom to the pipe $b'$ in turning, a ring $e$ is secured to it beyond the end of the discharge-pipe. A ring F is secured to the end portion of the pipe E and overlaps the ring $e$. The ring F is provided with slots $f$, and $f'$ are double-flanged rollers which are journaled in the said slots. These rollers run on the ring $e$ and their flanges prevent the deflector from being blown off the end of the discharge-pipe by the blast or otherwise becoming detached from it.

The supporting-rollers $f'$ may be variously constructed and may be made with or without flanges or with only one flange, and they may bear against the pipe $b'$ or against the ring $e$ or against both pipe and ring.

A flexible connection G—such as a cord, rope, chain, or wire—is provided for bending and revolving the deflector. This flexible connection or cord is preferably a single cord, but two separate cords may be used, if desired. The ends of this cord are secured to one side of the outer segment of the deflector by a bracket g. They may be secured to either side portion or to the upper side, but they must both be secured to the same side.

H H' are two sheaves carried by the pipe b' at the side of the deflector.

I I' are two sheaves carried by the pipe E at the top thereof. One portion of the cord G passes from the bracket g over the sheaves H and I, and the other portion of the cord passes from the bracket g over the sheave H', around the pipe b', and over the sheave I'.

J is a winch of approved construction carried by the lower part of the discharge-pipe.

J' is a block provided with a sheave j, and j' is a cord secured to the block J' and connected to the winch J.

When the discharge-pipe is not telescopic, the cord G passes around the sheave j, and thence goes direct to the sheaves I I'.

Any other approved means may be used for operating the cord or cords G besides the winch and cord.

Both ends of the cord G or both cords are pulled back simultaneously when the deflector is to be bent backward, and the spring-actuated deflector bends forward automatically when the cord G is released.

The deflector is revolved upon the axis of the discharge-pipe by pulling one end of the cord G by hand and releasing the other end.

The spring C is made strong enough to hold the deflector extended while it is being revolved. The deflector can be revolved for over a full revolution by appropriate management of the cord G, but it must be revolved in the reverse direction to restore it to its original position.

The sheaves I I' are preferably arranged at the top of the discharge-pipe, and when the deflector is moved slowly they prevent it from being turned, so as to throw the straw vertically upward. When it is desired to throw the straw vertically upward, the deflector is moved rapidly and its momentum then carries it around past the position where it would ordinarily be stopped by the said sheaves.

The object of attaching both ends of the cord G to the same side of the outer segment of the deflector is to permit the deflector to be revolved for as nearly a full revolution as possible. If the ends of the cord G were attached to the opposite sides of the deflector, the deflector could only be moved for less than half a revolution. It will also be noticed that the deflector can be bent backward or forward when standing at any angle without changing the said angle and that it can be revolved in either direction when bent to any position without previously changing it from its bent position.

When the discharge-pipe is telescopic, means for permitting it to slide in or out without affecting the cord G are provided. These consist of two sheaves K K', supported from the lower pipe-section A in any approved manner, three sheaves m, n, and o, carried by the lower portion of the pipe A', and a sheave p, carried by the block J'. The cord G passes from the sheave I over the sheaves m, K, p, n, j, K', and o to the sheave I' in the order written and is kept taut in all positions of the telescopic pipe.

I do not claim, broadly, a discharge-pipe, a revoluble deflector, sheaves on the pipe, and cords running over the sheaves and connected to the deflector so that it may be revolved by pulling them. Nor do I claim a revoluble and flexible deflector and an operating cord or cords affording a means both for bending and revolving it.

What I claim is—

1. The combination, with a discharge-pipe, and a revoluble spring-extended deflector having pivoted segments; of sheaves carried by the said pipe and deflector, and flexible connections attached to one side of the outer segment of the deflector and passing over the said sheaves, whereby the said deflector may be bent backward and revolved, substantially as set forth.

2. The combination, with a discharge-pipe, and a revoluble spring-extended deflector having pivoted segments; of the sheaves H H' at one side of the deflector, the sheaves I I' at the top of the discharge-pipe, and flexible connections attached to one side of the outer segment of the deflector, one said flexible connection passing over the sheaves H and I, and the other passing over the sheave H' and thence, in the opposite direction from the first flexible connection, over the sheave I', substantially as set forth.

3. The combination, with a discharge-pipe, and a revoluble spring-extended deflector having pivoted segments; of sheaves carried by the said pipe and deflector, a flexible connection having its ends attached to one side of the outer segment of the deflector and passing over the said sheaves, a sheave carrying the middle portion of the said flexible connection, and means—such as a winch and cord—for supporting the said sheave and moving it longitudinally of the discharge-pipe, substantially as set forth.

4. The combination, with a discharge-pipe formed of telescopic sections, and a revoluble spring-extended deflector having pivoted segments, of the sheaves H H' carried by the said deflector, the sheaves I I' carried by the upper end of the slidable pipe-section, the sheaves m, n, o, carried by the lower end of the slidable pipe-section, the sheaves K K' supported from the non-slidable pipe-section, a block provided with sheaves j and p, means—such as a winch and cord—for supporting the said block and moving it longitudinally of the discharge-pipe, and a flexible connection having its ends attached to one side of the outer segment of the deflector and passing over all the said sheaves, substantially as set forth.

5. The combination, with a straw-stacker discharge-pipe having a short pipe-section secured over its upper end portion, and a distance-ring interposed between the two said pipes; of a deflector provided with a short pipe arranged in the annular space between the two said pipes and bearing against the said ring; and means for revolving the said deflector and its said short pipe, substantially as set forth.

6. The combination, with a discharge-pipe having a short pipe-section secured over its upper end portion, and an annular bearing arranged between the two said pipes; of a deflector provided with a short pipe revoluble between the two said pipes and against the said bearing, and means for preventing the said revoluble short pipe from moving longitudinally, substantially as set forth.

7. The combination, with a discharge-pipe having a short pipe-section E secured over its upper end portion, of a deflector provided with a short section of pipe $b'$ revoluble in the pipe E, a ring secured on the pipe $b'$ beyond the end of the pipe E, a ring provided with slots and secured to the end portion of the pipe E, and flanged rollers journaled in the said slots and engaging with the said ring on the pipe $b'$, substantially as set forth.

8. The combination, with a discharge-pipe, of a deflector provided with a short section of pipe revoluble in the end portion of the discharge-pipe, and rollers carried by the said discharge-pipe and supporting the projecting portion of the said short section of pipe, substantially as set forth.

In testimony whereof I affix my signature in presence of two witnesses.

FRANK F. LANDIS.

Witnesses:
   T. S. CUNNINGHAM,
   E. S. RINEHART.